(12) United States Patent
Felderman et al.

(10) Patent No.: US 8,161,023 B2
(45) Date of Patent: Apr. 17, 2012

(54) INSERTING A PDF SHARED RESOURCE BACK INTO A PDF STATEMENT

(75) Inventors: Gregory Scott Felderman, Westminster, CO (US); Brian Keith Hoyt, Thornton, CO (US)

(73) Assignee: Internatioanal Business Machines Corporation, Armonk, NY (US)

( * ) Notice: Subject to any disclaimer, the term of this patent is extended or adjusted under 35 U.S.C. 154(b) by 437 days.

(21) Appl. No.: 12/250,109

(22) Filed: Oct. 13, 2008

(65) Prior Publication Data

US 2010/0094821 A1 Apr. 15, 2010

(51) Int. Cl.
*G06F 7/00* (2006.01)
*G06F 17/30* (2006.01)

(52) U.S. Cl. .......................................... 707/705; 715/209

(58) Field of Classification Search ................... 715/209
See application file for complete search history.

(56) References Cited

U.S. PATENT DOCUMENTS

| | | | |
|---|---|---|---|
| 6,035,287 A | 3/2000 | Stallaert et al. | |
| 6,415,278 B1 | 7/2002 | Sweet et al. | |
| 6,801,673 B2 | 10/2004 | Chao et al. | |
| 6,895,550 B2 | 5/2005 | Kanchirayappa et al. | |
| 6,992,786 B1 | 1/2006 | Breding et al. | |
| 7,010,793 B1 | 3/2006 | Chatterjee et al. | |
| 7,013,309 B2 | 3/2006 | Chakraborty et al. | |
| 7,020,837 B1 * | 3/2006 | Kueny | 715/234 |
| 7,242,685 B1 | 7/2007 | Rash et al. | |
| 2004/0199876 A1 | 10/2004 | Ethier et al. | |
| 2005/0125724 A1 | 6/2005 | Peiro et al. | |
| 2005/0203919 A1 | 9/2005 | Deutsch et al. | |
| 2006/0053119 A1 | 3/2006 | Aden et al. | |
| 2006/0190493 A1 | 8/2006 | Kawai et al. | |
| 2006/0200457 A1 | 9/2006 | McCammon et al. | |
| 2007/0055933 A1 | 3/2007 | Dejean et al. | |
| 2007/0088671 A1 | 4/2007 | McElroy et al. | |
| 2007/0100865 A1 | 5/2007 | King et al. | |
| 2007/0136363 A1 | 6/2007 | Thielen | |
| 2007/0180493 A1 | 8/2007 | Croft et al. | |
| 2007/0183000 A1 * | 8/2007 | Eisen et al. | 358/452 |
| 2008/0028333 A1 | 1/2008 | Perelman et al. | |
| 2008/0084573 A1 | 4/2008 | Horowitz et al. | |
| 2008/0112013 A1 | 5/2008 | Ferlitsch et al. | |
| 2008/0148142 A1 | 6/2008 | Lee et al. | |
| 2008/0184107 A1 | 7/2008 | Chew et al. | |

OTHER PUBLICATIONS

Hoyt et al., Co-pending application entitled "System and Method for Extracting PDF Resources for Archival".
Fanning, "Preserving The Data Explosion: Using PDF," *DPC Technology Watch Series Report* 08-02, Apr. 2008.

(Continued)

*Primary Examiner* — Shew-Fen Lin
*Assistant Examiner* — Christy Lin
(74) *Attorney, Agent, or Firm* — Kunzler Needham Massey & Thorpe (57) ABSTRACT

According to one embodiment of the present invention, a method for inserting a PDF shared resource back into a PDF statement is provided. The method includes storing a set of statements, wherein each statement has been extracted from a document and each statement contains indirect objects. A set of resources is then stored, wherein the resources have been extracted from the document, and the resources include a set of indirect objects. All of the indirect objects in a selected one of the stored statements are then enumerated and a determination is made of which of the indirect objects contain keys. A key value for the enumerated indirect objects containing keys is then read, and the indirect objects in the stored set of resources associated with each key are identified. Stream data is then copied from the indirect objects in the stored set of resources into the selected ones of the stored statements.

18 Claims, 5 Drawing Sheets

OTHER PUBLICATIONS

Shanmugasundaram et al., "Automatic Reassembly of Document Fragments Via Data Compression," $2^{nd}$ Digital Forensics Research Workshop, 2003, http://www.acsac.org/2003/papers/97.pdf.

PDFlib Text Extraction Toolkit (TET) Reference Manual, Version 2.2, PDFlib GmbH Muenchen, Germany, www.pdflib.com, c 2002-2007.

Hassan et al, "Intelligent Text Extraction from PDF Documents," Database and Artificial Intelligence Group, Institute of Information Systems, IEEE, c 2005.

Notice of Allowance received from USPTO, U.S. Appl. No. 12/548,217, Received Sep. 14, 2011.

* cited by examiner

INSERTING A PDF SHARED RESOURCE BACK INTO A PDF STATEMENT

BACKGROUND

The present invention relates to archiving documents, and more specifically, to archiving Portable Document Format (PDF) reports as individual PDF statements.

Report management systems and archival retrieval systems are frequently used to store large quantities of data. For example, such systems may be used to store credit card statements, bank account statements, utility monthly statements, and similar data. The length of time that such data must be kept may determine the storage medium used, such as hard drive, optical disk, or tape. In any case, it is desirable to store data in a way that makes the data easily and rapidly accessible and also in a manner that minimizes the required storage space.

Archived documents may be stored in various formats, including Advanced Function Presentation, (AFP) and Portable Document Format (PDF). Archived PDF documents may include "statements", such as bank statements or other documents, as well as "reports", which comprise a collection of individual statements. When archiving PDF reports containing many statements, these statements may need to be stored as individual PDF documents in order to satisfy performance or functional requirements. Such functional requirements may include, for example, placing legal holds on a subset of statements, or placing one or more of those statements into a work flow process. In these instances, it is necessary to store the individual statements as stand alone documents.

When storing individual PDF statements in this manner, as stand alone documents, PDF "shared resources" need to be duplicated along with each and every statement stored. PDF shared resources are the part of a PDF document that enables the data to be displayed in a particular manner. For example, the shared resources in a PDF report may include overlays that define boxes around certain parts of the text, custom fonts, logos that are placed on each page in the same place, images, etc. However, duplicating each of these shared resources in each archived statement greatly increases storage requirements. Some archival systems are able to accept this requirement. Other archival systems may not extract the statements at all and instead simply archive the entire report as a single entity. In this way storage requirements are not greatly increased, unless a document has to be held or put into a work flow process. However, performance is affected because when a document has to be retrieved for viewing or printing, the entire report has to be retrieved in order to extract the requested statement.

SUMMARY

According to one embodiment of the present invention, a method comprises: storing a set of statements, wherein each statement has been extracted from a document and each statement contains indirect objects; storing a set of resources, wherein the resources have been extracted from the document, the resources including a set of indirect objects; enumerating all of the indirect objects in a selected one of the stored statements; determining which of the indirect objects contains keys; reading a key value for the enumerated indirect objects containing keys; identifying indirect objects in the stored set of resources associated with each key; and copying stream data from the indirect objects in the stored set of resources into the selected one of the stored statements.

According to another embodiment of the present invention, a method comprises: receiving a request for a stored PDF statement, the stored PDF statement having been stored along with a set of PDF shared resources, wherein the PDF shared resources and the PDF statement have been extracted from a PDF document, the stored PDF statement and the stored PDF shared resources including indirect objects; enumerating all of the indirect objects in the requested stored PDF statement; reading a key value for selected ones of the enumerated indirect objects containing a key; identifying indirect objects in the stored set of PDF resources associated with each key; copying stream data from the indirect objects in the stored set of PDF resources into the requested stored PDF statements; and outputting the requested PDF statement including indirect objects with the stream data.

According to a further embodiment of the present invention, a system comprises: an object repository containing a set of stored PDF statements extracted from a PDF report and a set of PDF shared resource objects extracted from the PDF report; and a statement reassembly unit for reassembling PDF statements with a set of corresponding PDF resources, the corresponding PDF resources being generated using selected ones of the stored PDF shared resource objects.

According to another embodiment of the present invention, a computer program product for inserting a shared resource back into a stored statement comprises: a computer usable medium having computer usable program code embodied therewith, the computer usable program code comprising: computer usable program code configured to: store a set of statements wherein each statement has been extracted from a document and each statement contains indirect objects; store a set of resources, resources have been extracted from the document, the resources including a set of indirect objects; enumerate all of the indirect objects in a selected one of the stored statements; determine which of the indirect objects contain keys; read a key value for the enumerated indirect objects containing keys; identify indirect objects in the stored set of resources associated with each key; and copy stream data from the indirect objects in the stored set of resources into the selected one of the stored statements.

DETAILED DESCRIPTION

Embodiments of the invention provide a system, method and computer program product for reassembling archived shared resources with the statements within an archived PDF report at view or print time after shared resources for statements within a PDF report have been archived separately.

This results in a solution whereby high volume and low storage requirements can be implemented. In some prior archival systems, PDF shared resources were duplicated and stored with each statement, which greatly increased storage requirements. In other prior archival systems, an entire PDF report was archived as a single PDF document, which reduced performance because the entire report needed to be retrieved in order to extract a single statement. The present invention, as compared to these prior systems, provides an archival system which has lower storage requirements than the former archival systems, and higher volume performance than the latter archival systems.

The present invention does this, according to one embodiment, by inserting a PDF shared resource back into a PDF statement. The method includes storing a set of statements, wherein each statement has been extracted from a report and each statement contains indirect objects. A set of resources is then stored, wherein the resources have been extracted from the report, and the resources include a set of indirect objects. All of the indirect objects in a selected one of the stored statements are then enumerated and a determination is made of which of the indirect objects contain keys. A key value for the enumerated indirect objects containing keys is then read, and the indirect objects in the stored set of resources associated with each key are identified. Stream data is then copied from the indirect objects in the stored set of resources into the selected ones of the stored statements.

It will be appreciated that, while the teachings of the present invention are explained using PDF documents as an example, these teachings may be applied to other documents besides PDF documents. As used herein, the term "PDF Statement" means a single PDF document that will need to be later viewed, printed or stored for a particular period of time. The term "PDF report" means a large PDF document comprised of many individual PDF statements.

Figure 1:
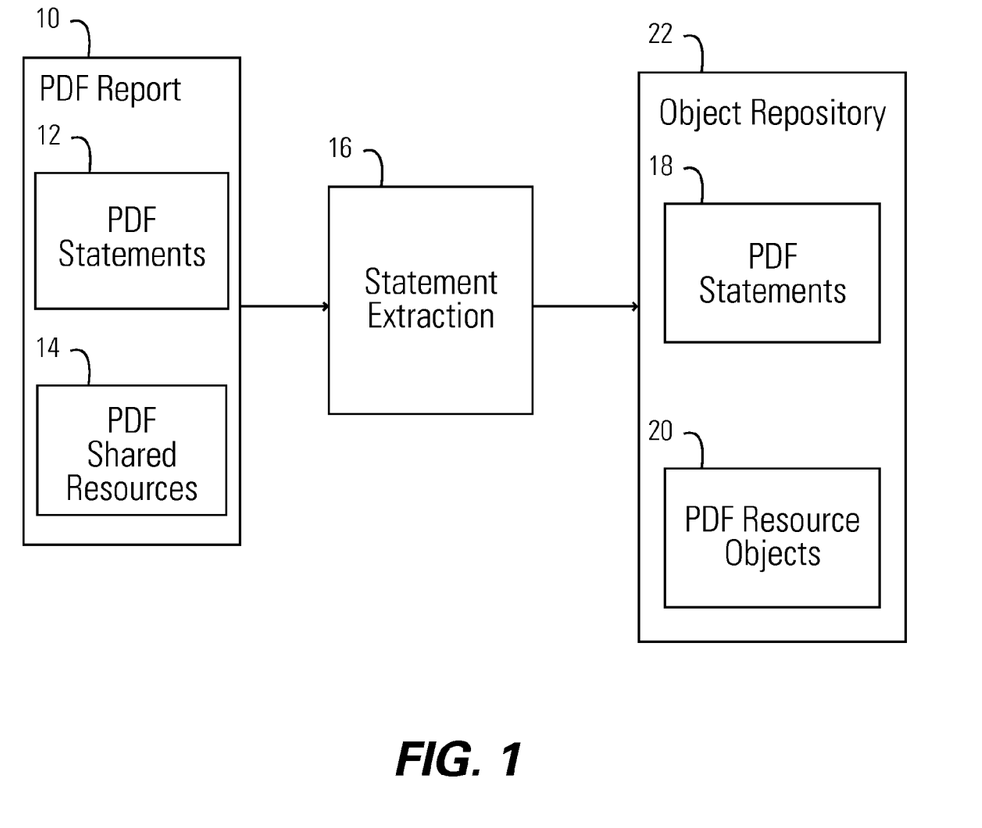
FIG. 1 shows a block diagram of the extraction of PDF resource indirect objects from statements in a PDF report in accordance with an embodiment of the invention.

FIG. 1 shows a high level diagram of the archiving of a PDF report in which shared PDF resources objects are extracted. In more detail, a PDF report 10 includes PDF statements 12 and PDF shared resources 14. The PDF report 10 may comprise, a collection of a large number of statements 12, where the statements, may be, for example, bank statements, credit card statements, utility bills, or other documents. The statements are extracted from the PDF report 10 by a statement extractor 16. The result of this extraction process is a set of PDF statements 18 and PDF resource objects 20 which may be stored in an object repository 22. In more detail, the following are steps that may be used to accomplish the removal of PDF resource objects 20 from a PDF report 10 in accordance with an embodiment of the invention:

1. All PDF indirect objects from the source PDF report 10 must be enumerated.
2. As PDF resource objects are discovered during this enumeration, append the CosObj representing this resource object to a new PDF resource document. It will be appreciated that "COSObj" is a general object in a PDF file. It is a general representation of a more specific Cos object within a PDF file. This CosObj will be given a new ID in the resource PDF file.
3. Create a new key in the source resource objects dictionary to hold the object ID of the copied resource object from step 2 above.
4. Remove the stream data from the source resource object.
5. Extract the pages for each statement from the report. These pages can now be written out to individual statement PDF documents. The resource objects referenced in these statements will be copied to the statement documents but since they do not contain stream data, the storage overhead incurred is minimal.

Additional details of this extraction process may be found in co-pending patent application Ser. No. 12/548,217, entitled "System and Method of Extracting PDF Resources for Archival", which is incorporated by reference in its entirety.

Figure 2:
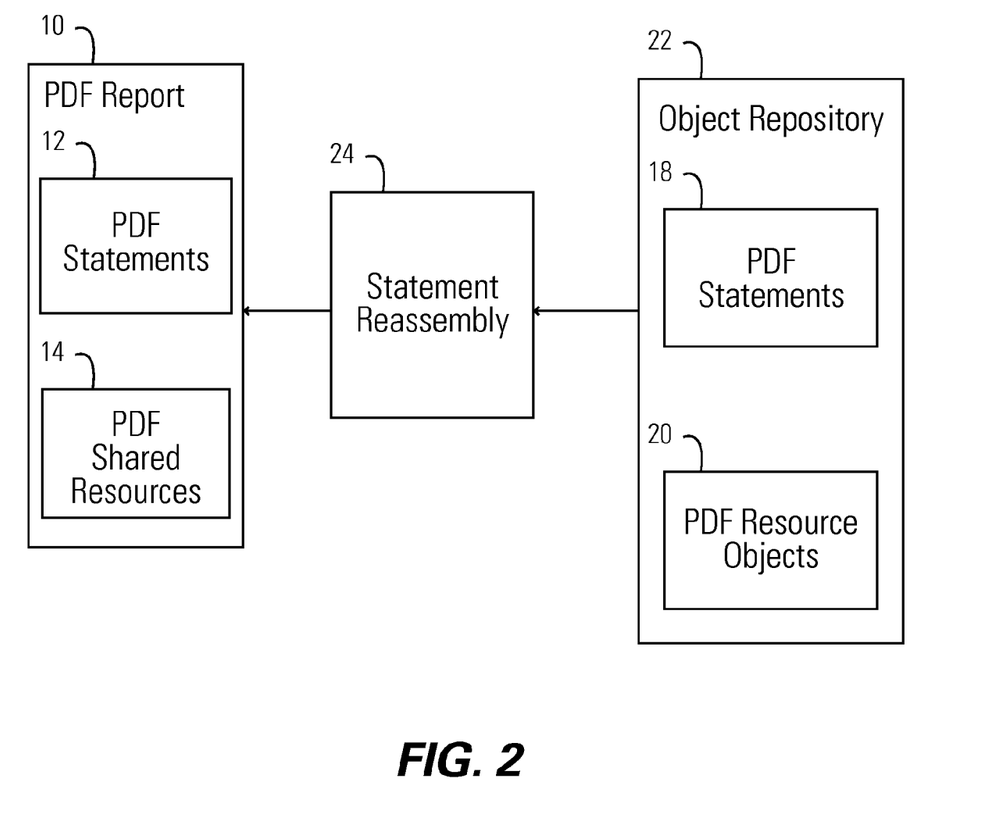
FIG. 2 shows a diagram of the reassembly of PDF shared resources into a PDF statement in accordance with an embodiment of the invention.

FIG. 2 shows a high-level diagram of the insertion of a PDF shared resource back into a PDF statement in accordance with an embodiment of the invention. When a request for an archived PDF statement is made, for example, to view of print the statement, the reverse of the process shown in FIG. 1 is performed. In particular, a statement reassembly unit 24 receives the archived PDF statements 18 and the archived PDF resource objects 20, and reassembles them into the PDF statements 12 and PDF shared resources 14. This enables the viewing or printing of the original PDF statement 12 in the PDF report 10.

In more detail, the following are the steps required to accomplish the reassembly of a PDF statement's required resources:

1. The PDF statement's indirect objects must be enumerated.
2. As PDF resource objects are discovered during this enumeration, read a key from the resource objects dictionary that contains the ID of the resource object in the resource PDF file.
3. Copy the stream data from the resource object in the resource file into the resource object in the PDF statement.

Figure 3:
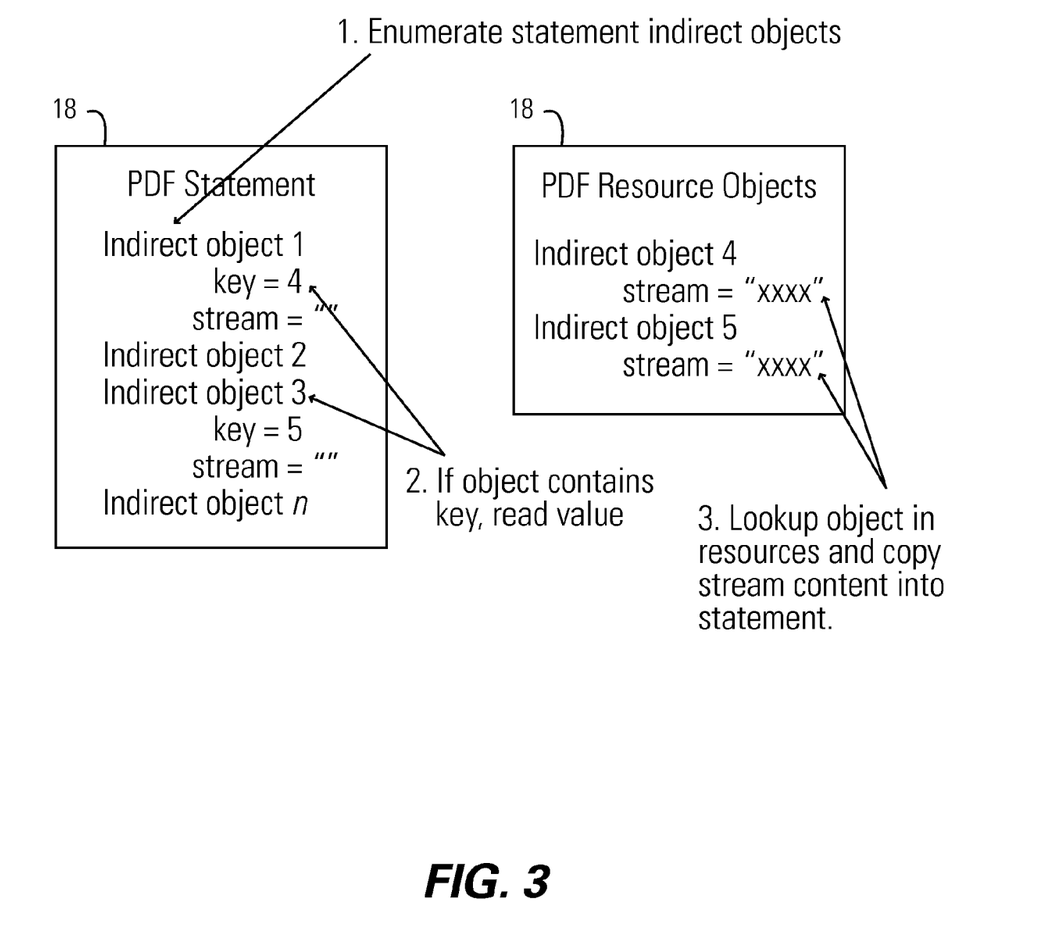
FIG. 3 shows a diagram of additional details of the process of reassembling PDF shared resources into a PDF statement in accordance with an embodiment of the invention.

FIG. 3 shows a diagram of these three main steps. A PDF statement 18, which has been archived according to the above-described procedure, contains a list of indirect objects. It will be appreciated that the term "PDF indirect objects" refers to an object in a PDF statement that references, or points to a shared PDF resource. Indirect object used by this PDF statement 18 will contain an ID or key when archived according to the above-referenced technique. For example, indirect object 1 contains key=4, and indirect object 3 contains key=5. Indirect object 2, however, does not contain a key because this resource is not shared across statements and was therefore not archived in the PDF resources object 20. In step 1 all the indirect objects in the PDF statement 18 are enumerated.

In step 2, for those indirect objects containing a key value, the key value is read. In this example, indirect objects 1 and 3 contain keys 4 and 5 respectively, hence key values 4 and 5 are read. In step 3, indirect objects with an ID of 4 and 5 in the PDF resources object 20 are read and the corresponding steam data from the object is copied into the PDF statement. The term "stream data" is a well know PDF term that refers to an object containing binary data which, in this case defines the shared resource. For example, indirect object 4 in the PDF resources object 20 matches key 4 and its steam data, shown as "XXXX", is copied into indirect object 1 in the PDF statement 18. Likewise, indirect object 5 in the PDF resources object 20 matches key 5 so its stream data is copied into the stream data for indirect 3 in PDF statement 18.

Figure 4:
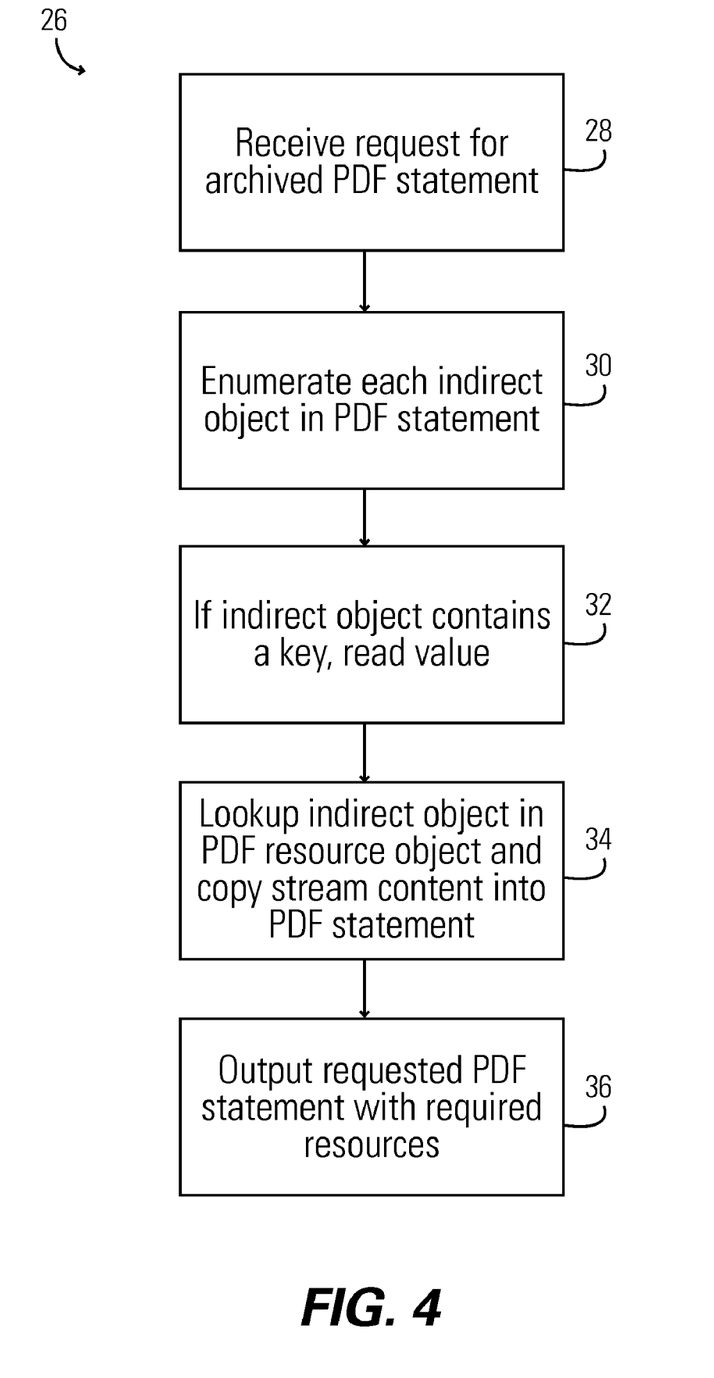
FIG. 4 shows a flowchart of a process for reassembling PDF shared resources into a PDF statement in accordance with an embodiment of the invention.

In practice, in accordance with an embodiment of the invention, the reassembly process will usually be made in response to a request for access to a PDF statement that has been archived according to the above-described process. FIG. 4 shows a flowchart of a process 26 for reassembling a shared PDF resource back into a requested PDF statement in accordance with an embodiment of the invention. In step 28, a request for an archived PDF statement is received. In response, each indirect object in the requested PDF statement is enumerated, in step 30. In step 32, for each of the enumerated indirect objects that contain a key, the key value is read from the resource object's dictionary, which is in the PDF resource object 20. The process 26 then looks up indirect objects in the archived PDF resource object 20 corresponding to the key and copies the stream data back into the PDF statement, in step 34. Finally, in step 36, the requested PDF statement is provided. As a result of the reassembly of the PDF resources back into the PDF statement, 18 this statement may now be printed, viewed, or otherwise accessed as needed.

As can be seen from the above disclosure, embodiments of the invention provide an archival system that implements a process 26 that can be performed with much greater speed than with prior archival systems that stored the entire PDF report as a single entity. Also, the storage requirements with the present invention are much less than with prior archival systems that required duplicate PDF resources to be stored with every archived statement.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
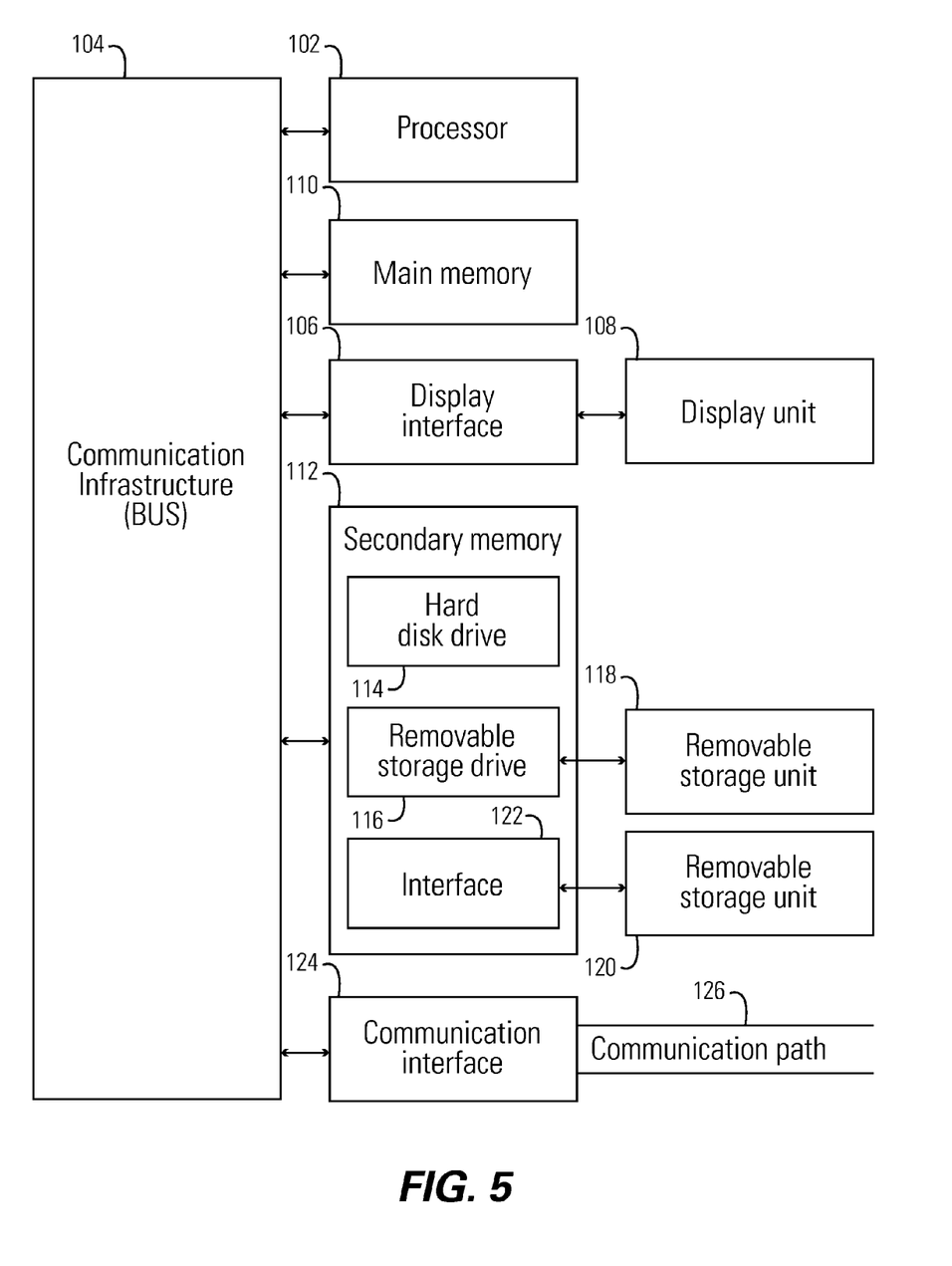
FIG. 5 shows a high level block diagram of an information processing system useful for implementing one embodiment of the present invention.

FIG. 5 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

storing, by use of a processor, a set of statements in a single object repository, wherein each statement has been extracted from a document, if the document statement references a statement indirect object comprising stream data, the stream data is removed from the statement indirect object and a key from the statement indirect object and referencing the stream data is appended to the statement indirect object in the single object repository, and if the document statement does not reference a statement indirect object comprising stream data, storing the statement indirect object only with the set of statements;

storing a set of resources in said single object repository, wherein said stored set of resources have been extracted from said document, said stored set of resources comprising a resource indirect object for each statement indirect object with stream data, each resource indirect object comprising the key and the stream data of the statement indirect objects;

receiving a request for a first statement of the set of statements;

enumerating all statement indirect objects in the first statement;

determining which of said enumerated statement indirect objects contains keys;

reading each key value for said enumerated statement indirect objects containing keys;

identifying said resource indirect objects in said stored set of resources associated with each key; and copying stream data from said identified resource indirect objects in said stored set of resources into said first statements.

2. The method according to claim 1 wherein said documents, statements, and resources are PDF documents, PDF statements and PDF shared resources, respectively.

3. The method according to claim 2 wherein said PDF document is a PDF report and said set of PDF statements are included in said PDF report.

4. The method according to claim 2 wherein each key is an identifier of an indirect object used by a stored PDF statement.

5. The method according to claim 4 wherein said stored PDF resources include a list of said indirect objects each identified by a corresponding key value.

6. The method according to claim 1 wherein said step of reading further comprises reading a key value from a resource object dictionary.

7. The method according to claim 2 wherein said PDF statement is a bank statement.

8. A method comprising:
    storing, by use of a processor, a set of Portable Document Format (PDF) statements in a single object repository, wherein each PDF statement has been extracted from a PDF document, if the document statement references a statement indirect object comprising stream data, the stream data is removed from the statement indirect object and a key from the statement indirect object and referencing the stream data is appended to the statement indirect object in the single object repository, and if the document statement does not reference a statement indirect object comprising stream data, storing the statement indirect object only with the set of PDF statements;
    storing a set of PDF resources in said single object repository, wherein said stored set of PDF resources have been extracted from said document, said set of PDF resources comprising a resource indirect object for each statement indirect object with stream data, each resource indirect object comprising the key and the stream data of the statement indirect receiving a request for a first PDF statement of said set of PDF statements;
    enumerating all PDF statement indirect objects in the first statement;
    reading each key value for selected ones of said enumerated statement indirect objects containing a key;
    identifying said resource indirect objects in said stored set of PDF resources associated with each key;
    copying stream data from said identified resource indirect objects in said set of PDF resources into said first PDF statement; and
    outputting said first PDF statement including indirect objects with said stream data.

9. The method according to claim 8 further comprising printing said first PDF statement using said indirect objects with said copied stream data.

10. The method according to claim 8 wherein said PDF statement is a credit card statement.

11. The method according to claim 8 wherein said PDF document is a PDF report.

12. A system comprising:
    a computer-readable storage device storing computer useable program code;
    a processor executing the computer useable program code, the computer useable program code comprising:
    a single object repository containing a set of stored Portable Document Format (PDF) statements extracted from a PDF report, wherein each PDF statement has been extracted from a document, if the document statement references a statement indirect object comprising stream data, the stream data is removed from the statement indirect object and a key from the statement indirect object and referencing the stream data is appended to the statement indirect object in the single object repository, and if the document statement does not reference a statement indirect object comprising stream data, storing the PDF statement indirect object only with the set of statements, and a set of PDF resources extracted from said PDF report, wherein said set of PDF resources have been extracted from said document, said set of PDF resources comprising a resource indirect object for each statement indirect object with stream data, each resource indirect object comprising the key and the stream data of the statement indirect objects;
    a statement reassembly unit for reassembling PDF statements with said set of PDF resources by:
    receiving a request for a first statement of the set of PDF statements; enumerating all statement indirect objects in the first statement;
    determining which of said enumerated statement indirect objects contains reading each key value for said enumerated statement indirect objects containing keys;
    identifying said resource indirect objects in said stored set of PDF resources associated with each key; and
    copying stream data from said identified resource indirect objects in said set of PDF resources into said first statement.

13. A computer program product for inserting a shared resource back into a stored statement, said computer program product comprising a non-transitory computer-readable storage medium storing computer usable program code executed by a processor to perform the operations of:
    store a set of statements in a single object repository wherein each said statement has been extracted from a document~if the document statement references a statement indirect object comprising stream data, the stream data is removed from the statement indirect object and a key from the statement indirect object and referencing the stream data is appended to the statement indirect object in the single object repository, and if the document statement does not reference a statement indirect object comprising stream data, storing the statement indirect object only with the set of statements;
    store a set of resources in said single object repository, wherein said stored set of resources have been extracted from said document, said stored set of resources comprising a resource indirect object for each statement indirect object with stream data, each resource indirect object comprising the key and the stream data of the statement indirect objects;
    receive a request for a first statement of the set of statements;
    enumerate all statement indirect objects in the first statement;
    determine which of said enumerated statement indirect objects contain keys;
    read each key value for said enumerated statement indirect objects containing keys;
    identify said resource indirect objects in said set of resources associated with each key; and
    copy stream data from said identified resource indirect objects in said set of resources into said first statement.

14. The computer program product according to claim 13 wherein said documents, statements, and resources are PDF documents, PDF statements and PDF shared resources, respectively.

15. The computer program product according to claim 14 wherein said PDF document is a PDF report and said set of PDF statements are included in said PDF report.

16. The computer program product according to claim 15 wherein each key is an identifier of an indirect object used by a stored PDF statement.

17. The computer program product according to claim 16 wherein said stored PDF resources include a list of indirect objects each identified by a corresponding key value.

18. The computer program product according to claim 13 wherein said computer usable program code is further configured to read a key value from a resource object dictionary.

* * * * *